United States Patent [19]
McGregor et al.

[11] Patent Number: 5,982,548
[45] Date of Patent: Nov. 9, 1999

[54] THIN LIGHT REFLECTANT SURFACE AND METHOD FOR MAKING AND USING SAME

[75] Inventors: Gordon L. McGregor, Landenberg, Pa.; Raymond B. Minor, Elkton, Md.

[73] Assignee: W. L. Gore & Associates, Inc., Newark, Del.

[21] Appl. No.: 08/858,115

[22] Filed: May 19, 1997

[51] Int. Cl.$^6$ .............................. G02B 5/08; F21V 7/00
[52] U.S. Cl. ............................. 359/599; 359/350
[58] Field of Search ................... 359/350, 361, 359/599, 515, 588, 270; 372/35, 54, 72, 89; 385/129–131, 141, 146; 428/212, 213, 311.1, 315.5; 362/200, 221, 299; 349/113

[56] References Cited

U.S. PATENT DOCUMENTS

| | | | |
|---|---|---|---|
| 3,953,566 | 4/1976 | Gore | 264/505 |
| 3,962,153 | 6/1976 | Gore | 521/79 |
| 4,035,085 | 7/1977 | Seiner | 356/408 |
| 4,096,227 | 6/1978 | Gore | 264/110 |
| 4,152,618 | 5/1979 | Abe et al. | 313/116 |
| 4,187,390 | 2/1980 | Gore | 174/102 R |
| 4,354,741 | 10/1982 | Mano et al. | 359/270 |

(List continued on next page.)

FOREIGN PATENT DOCUMENTS

| | | |
|---|---|---|
| 0 313 263 | 10/1988 | European Pat. Off. . |
| 0 372 224 | 6/1990 | European Pat. Off. . |
| 0 496 323 A2 | 1/1992 | European Pat. Off. . |
| 0 724 181 A2 | 7/1996 | European Pat. Off. . |
| 2008947 | 1/1970 | France . |
| 7-235714 | 9/1995 | Japan . |
| 96/21168 | 7/1996 | WIPO . |
| 97/08571 | 6/1997 | WIPO . |

OTHER PUBLICATIONS

G.W.C. Kaye, T.H. Laby: "Tables of Physical and Chemical Constraints" 1966, Longmans, Green And Co. Ltd., 48 Grosvenor Street, London.

General Information: Reflectance Component Fabrication, "Diffuse Reflectance Materials and Coatings, Spectralon, Spectraflect, Duraflect, Infragold and Infragold–LF," (Date Unknown).

Literature: "Solid Sample Measurements with the Cary 4 and Cary 5 Spectrophotometers," (Date Unknown) UV–VIS–NIR, Varian (VA).

Brochure: "Leadership," Dr. Arthur Springsteen, Lapshere (Date Unknown).

Brochure: "Labsphere Corporate Profile," Labsphere (Date Unknown).

Robert D. Saunders and Henry J. Kostkowski, "Roughened Quartz Surfaces and Teflon as small angle diffusers and depolarizers between 200 and 400 nm," Applied Optic, vol. 28, No. 15, Aug. 1, 1989 pp. 3242–3245.

Victor R. Weidner and Jack J. Hsia, "Reflection Properties of Pressed Polytetrafluoroethylene Powder," J. Optical Society of America, vol. 71, No. 7, Jul. 1981, pp. 856–861 International Search Report for PCT/US96/15111.

S. Nutter, C.R. Bower, N.W. Gebhard, R.M. Heinz and G. Spiczak, "Sintered Holan as a Diffuse Reflecting Liner for Light Integration Boxes," Nuclear Instruments & Methods in Physics Research, vol. A310, No. 3, Dec. 15, 1991, pp. 665–670.

(List continued on next page.)

*Primary Examiner*—Thong Nguyen
*Attorney, Agent, or Firm*—Allan M. Wheatcraft

[57] ABSTRACT

The present invention is an improved material and method for use for providing diffuse reflectivity of light. It has been determined that by employing a polymer having an index of refraction of greater than or equal to 1.42 and a porosity of greater than 10%, improved reflectivity can be achieved over existing reflectant materials having only one of these properties. Suitable materials for use in the present invention include nylon, polyvinylidene (PVDF), and cellulose acetate.

14 Claims, 7 Drawing Sheets

U.S. PATENT DOCUMENTS

| | | | |
|---|---|---|---|
| 4,463,045 | 7/1984 | Ahr et al. | 428/131 |
| 4,504,889 | 3/1985 | Goldfarb | 362/200 |
| 4,523,319 | 6/1985 | Pfost | 372/54 |
| 4,571,448 | 2/1986 | Barnett | 136/259 |
| 4,764,932 | 8/1988 | Peterson et al. | 372/35 |
| 4,772,124 | 9/1988 | Wooten et al. | 356/218 |
| 4,805,181 | 2/1989 | Gibson et al. | 372/72 |
| 4,902,423 | 2/1990 | Bacino | 210/500.36 |
| 4,912,720 | 3/1990 | Springsteen | 372/72 |
| 4,994,673 | 2/1991 | Perna et al. | 250/483.1 |
| 5,037,618 | 8/1991 | Hager | 422/186.03 |
| 5,051,878 | 9/1991 | Ngai | 362/299 |
| 5,075,827 | 12/1991 | Smith | 362/221 |
| 5,116,115 | 5/1992 | Lange et al. | 351/212 |
| 5,192,128 | 3/1993 | Ngai | 362/297 |
| 5,241,180 | 8/1993 | Ishaque et al. | 250/361 R |
| 5,263,042 | 11/1993 | Kojima et al. | 372/72 |
| 5,378,965 | 1/1995 | Dakin et al. | 315/248 |
| 5,422,756 | 6/1995 | Weber | 359/487 |
| 5,462,705 | 10/1995 | Springsteen | 264/122 |
| 5,488,473 | 1/1996 | Springsteen et al. | 356/317 |
| 5,596,450 | 1/1997 | Hannon et al. | 359/599 |
| 5,689,364 | 11/1997 | McGregor et al. | 359/599 |
| 5,710,856 | 1/1998 | Ishii et al. | 385/146 |

OTHER PUBLICATIONS

Literature: TK Lewellen, RS Miyaoka, SG Kohlmyer, "Improving the Performance of the SP–3000 PET Detector Modules," University of Washington, Seattle, Washington, Nov. 1991, pp. 1604–1608.

Literature: K. Wisshak, F. Kappeler, and H. Muller, "Prototype Crystals For the Karlsruhe 4 Barium Fluoride Detector," Physics Research A251 (1986) 101–107.

Literature: Carol J. Bruegge, Albert E. Stiegman, Daniel R. Coulter, Robert R. Hale, David J. Diner, "Reflectance stability analysis of Spectralon diffuse calibration panels," SPIE vol. 1493 (1991), pp. 132–142.

Literature: A.W. Springsteen, "A Novel Class of Lambertian Reflectance Materials for Remote Sensing Application," Labsphere, Inc., SPIE, vol. 1109, Optical Radiation Measurements II (1989) pp. 133–141.

Technical Information: Arthur W. Springsteen, Ph.D., "Properties of Spectralon Reflectance Material," (Date Unknown).

THIN LIGHT REFLECTANT SURFACE AND METHOD FOR MAKING AND USING SAME

BACKGROUND OF THE INVENTION

1. Field of the Invention

The present invention relates to surfaces used to reflect light, and particularly to highly light reflectant surfaces that provide even diffusion of light energy from their surfaces.

2. Description of Related Art

Special light reflectant surfaces are used in a variety of applications requiring light energy to be almost completely reflected while providing an even distribution of light from the surface. While good mirrored surfaces can provide nearly perfect reflectivity of visible light, the light energy exiting these surfaces does so only at an angle equal to the incident angle of light contact. For many applications it is important that light be reflected with an even distribution of light from the surface. This latter property is referred to as diffuse or "lambertian" reflectance.

For instance, projection screens, such as those used for slide or motion picture presentations, must provide both high reflectivity and a light diffusion/distribution over a sufficiently wide field so as to provide a clear image to most of an audience. Many reflectant screens employ a coating of glass beads or similar material as a reflectant aid to provide excellent reflectivity over a defined projection field (e.g., approximately 20° from a center line), with significantly diminished reflectivity outside of the defined projection field. These screens provide very good viewing within the defined field, and are less prone to interference from stray light sources other than the primary light source aimed perpendicular to the screen. In order to provide better viewing to a wider defined field, matte-finished screens are effective at providing a more even light distribution to an entire audience. Although hardly critical for most projection screen applications in darkened rooms, in either instance it is important that the screen absorb or transmit as little light as possible so as to assure maximum reflective image to the audience.

Reflectivity is far more critical in many other applications. For instance, displays used in electronic equipment (e.g., instrument panels, portable computer screens, liquid crystal displays (LCDs), etc.), whether relying on supplemental lights (e.g., backlight) or merely ambient light, require very good diffuse reflectant back surfaces to maximize image quality. Reflectivity is particularly critical with backlighted displays in battery powered equipment, where better reflectivity is directly related to smaller required light sources and resulting lower power demands.

A substantial but demanding light reflective market is the one for portable or laptop computer displays. This market is demanding because it requires high levels of diffuse reflection from very thin materials. For this market it is critical that the backlight reflector is relatively thin, i.e., less than 0.25 mm and preferably less than 0.15 mm, to minimize the thickness of the completed display assembly.

Due to the many different applications that exist for reflectant materials, it is not surprising that there are many different commercially available products with a variety of diffuse reflective properties. Until the present invention, the best known diffuse reflective material with excellent diffuse reflectivity was that described in U.S. Pat. No. 4,912,720 and sold under the trademark SPECTRALON by Labsphere, Inc., North Sutton, N.H. This material comprises lightly packed granules of polytetrafluoroethylene that has a void volume of about 30 to 50% and is sintered into a relatively hard cohesive block so as to maintain such void volume. Using the techniques taught by U.S. Pat. No. 4,912,720, it is asserted that exceptionally high diffuse visible light reflectance characteristics can be achieved with this material, with reflectance over previously available reflectant material increasing from 97% to better than 99%. Despite the advantages of the SPECTRALON material it does not appear to be available in very thin films of less than 0.25 mm, such as those needed for the laptop display markets, and furthermore at these thickness levels it is believed that adequate reflection performance can not be obtained.

One of the materials commonly used as a diffuse reflector in backlight reflectors applications is sold under the trade name of MELINEX® polyester films by ICI Films of Wilmington, Del. These materials are available in the desirable thickness range of less than 0.15 mm. However the maximum visible light reflectance of 0.13 mm thick material is only 88.4%. Furthermore, in measuring the diffuseness of this material, the diffusivity is much less than desired. Thicker films of this material, such as 0.25 mm thick material, achieve only a maximum visible reflectance of 94.3% while suffering from added thickness and stiffness.

SUMMARY OF THE INVENTION

The present invention is an improved material and method for providing very high diffuse reflectivity of light from a thin material. The present invention employs a reflectant material of porous polymer with an index of refraction of greater than or equal to 1.42. It has been determined that this structure provides extremely high diffuse reflectivity, with significantly better than 90% reflectance of light provided. In fact, the material of the present invention has demonstrated higher diffuse reflectivity at thickness levels less than 0.25 mm than the best diffuse reflective materials presently available.

Equally important, the material employed in the present invention demonstrates many other properties that make it particularly desirable for use as a reflectant material. First, the material is highly flexible, allowing it to be twisted and formed into a variety of shapes. This property vastly reduces the effort necessary to form many complicated reflective structures, and particularly non-planar structures. Moreover, many previously unattainable structures, such as extremely reflectant bendable structures, are now attainable through use of the present invention. Second, the material used in the present invention demonstrates excellent reflectant properties even at relatively thin (e.g., 0.25 mm) thicknesses, making the material lighter and less expensive to employ than presently available materials as well as lending its use to many applications not previously available.

Materials of the present invention can include, but are not limited to, porous polymeric films such as nylon, polyvinylidene (PVDF), and cellulose acetate. The only known use of these materials has typically been for microfiltration and DNA hybridization applications. A variety of techniques have been used to create these types of porous films out of various starting materials. It is desired to select a starting material based on index of refraction and other physical properties.

DESCRIPTION OF THE DRAWINGS

The operation of the present invention should become apparent from the following description when considered in conjunction with the accompanying drawings, in which.

DETAILED DESCRIPTION OF THE INVENTION

The present invention is an improved material and method for providing excellent diffuse light reflectance characteristics in a variety of reflectant products. As the term "light" is used herein, it is intended to include any form of electromagnetic radiation, but especially that in the spectrum of visible light (400 to 700 nm wavelength) and through infrared (IR) light radiation (700 to greater than 2500 nm wavelength). It should be appreciated that the material of the present invention may be tailored to modify reflectance in particular bands of light energy through the use of coatings, fillers, or similar materials.

Figure 8:
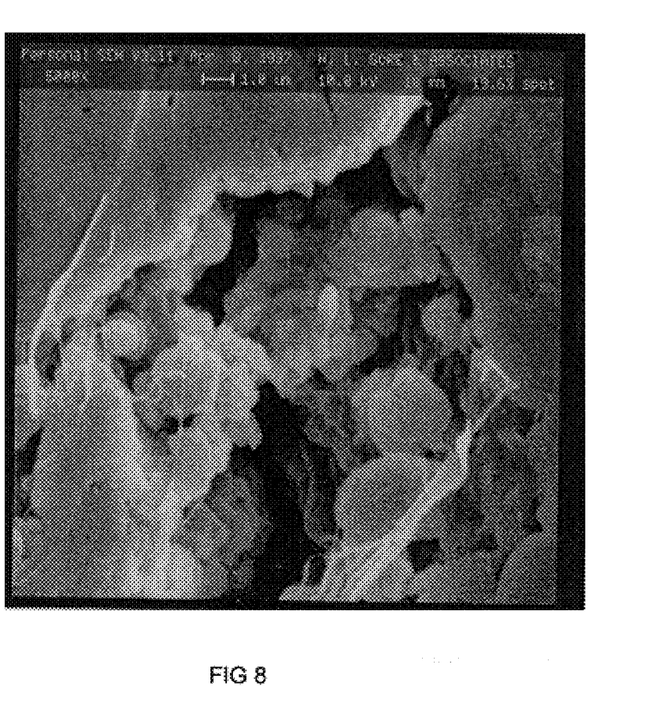
FIG. 8 is an SEM, enlarged 5000 times, of a comparative reflective material.

As has been explained, one of the better diffuse reflectant material commercially available today is that sold under the trademark SPECTRALON by Labsphere, Inc., of North Sutton, N.H. This material comprises a porous granular polytetrafluoroethylene material that is lightly packed and then molded into a rigid block. FIG. 8 is a scanning electron micrograph (SEM) of a surface of a ½ inch thick reflectant sheet of SPECTRALON material. While this material provides good reflectivity of visible and near IR light, providing up to about 99% diffuse, "lambertian," reflectance over portions of that spectrum of light, the material has a number of drawbacks that constrain its use. Among the perceived problems with this material are: difficulty in processing due to its rigidity and machinability, especially for thin sheets and where non-planar reflectant surfaces are required; and relatively thick minimum thicknesses (i.e., its effective reflectance diminishes at thicknesses of less than about 4 mm and the material is not available at thicknesses less than 1 mm). It is believed that one of the factors limiting SPECTRALON material's reflectance at thinner cross-sections is the relatively low refractive index level range of the base material of PTFE, which can range from 1.3 to 1.4, depending upon its percent of crystallinity.

Figure 9:
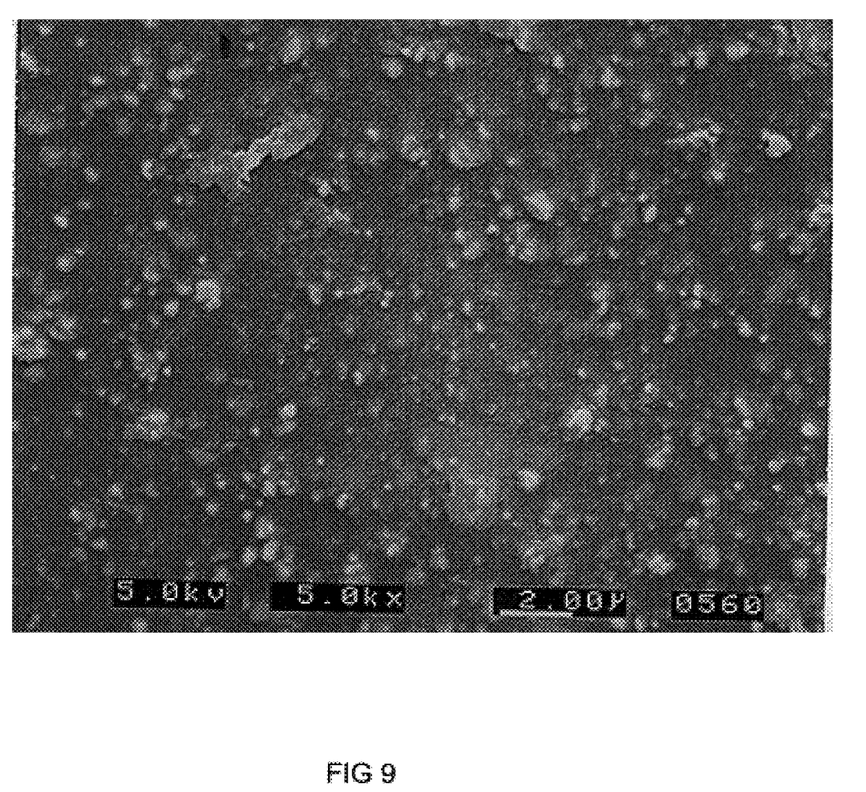
FIG. 9 is an SEM, enlarged 5000 times, of another comparative reflective material.

FIG. 9 is a scanning electron micrograph (SEM) of the surface of the 0.13 mm thick MELINEX, a comparative reflective material. It can be seen that the surface of the material is essentially non-porous. While this material does have a high index of refraction in the range of 1.56 to 1.64, it is not able to take full advantage of this high index of refraction to maximize reflection because of its non-porous nature. Thus, at this thickness, the highest reflection that was obtained over the entire visible wavelength range was only 89.2%.

It is a primary focus of the invention to provide a material that combines a high index of refraction material (equal to or greater than 1.42) with a porous structure to provide a high level of diffuse reflection in a thin cross section. It is believed that the higher the number of surface interfaces in a material the higher the level of reflectance. The number of surface interfaces in a material for a given thickness primarily depends upon both level of porosity and effective pore size of this porosity. It is believed materials with a range of porosity of approximately 10% to 90% can take advantage of this property. Preferably, materials that have porosities in the range 25% to 85% may perform better, and even more preferably, materials that have porosities in the range of 40% to 80% may perform the best.

To achieve these properties, the present invention may employ a variety of polymers. As is explained in greater detail below, nylon, polyvinylidene (PVDF), and cellulose acetate when properly selected in accordance with the present invention all have been demonstrated as having exceptional reflectivity. Other materials that can be constructed with suitable reflectivity and porosity to achieve diffuse reflectivity of greater than 90% include but are not limited to: polyester, polystyrene, polycarbonate, acrylic, polyacrylonitrile, methylmethacrylate, polypropylene, polyethylene, polyvinyl chloride, and polyamide.

One example of making porous nylon 6,6 membrane films is described in an article entitled "A Run On Nylons: A Survey of Nylon Blotting Membranes," by Michael Brush, *Bio Consumer Review* (Feb/Mar 95). A summary of this article follows. The first steps in making a porous nylon membrane begin with plastic resin chips. These chips are dissolved in a mixture of solvents, forming a thick slurry that is ultimately cast upon a stainless steel plate under very clean conditions. Solvent evaporation from the freshly cast slurry, by manipulation of such parameters as air flow across the membrane and temperature, allows for accurate regulation of the pore sizes in the final membranes. A fast evaporation rate produces small pores. Conversely, a slower evaporation rate will produce larger pores in the nylon. Manufacturers produce different types of nylon by varying the starting resins, solvents and drying conditions. Some membranes are subjected to chemical baths to alter their surfaces.

It is also believed that materials that have the smallest effective pore size can further increase the material's reflectance. Pore sizes of less than 1.20 micron for nylon material have been shown to be preferable. However, even larger pore sizes of up to or greater than 5.0 microns may be useful for other types of materials.

It is also believed that the value of a high index of refraction in a material enables the material to refract light with a higher degree of efficiency for each surface interface than a material with a lower index of refraction. Therefore, it is a primary purpose of the present invention to combine the properties of high index of refraction and porosity as a means to create a high diffuse reflectant material of thin cross section.

Figure 4:
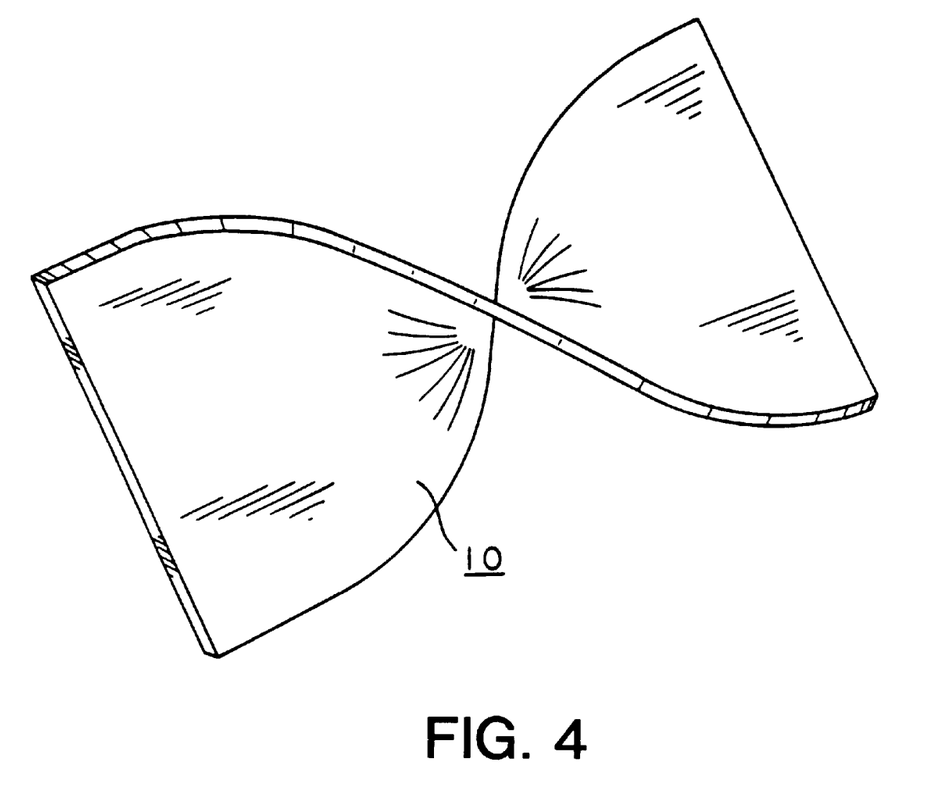
FIG. 4 is a three-quarter isometric view of a reflectant material of the present invention, wherein the flexibility of the material is demonstrated.

Another important improvement of the present invention is shown in FIG. 4. This thin diffuse reflectant material 10 of the present invention is highly malleable, moldable, and flexible, allowing it to be bent, twisted, curved, or otherwise formed into any suitable shape. In this respect, the reflectant material of the present invention is a dramatic improvement over previously available highly reflectant materials, such as SPECTRALON polytetrafluoroethylene reflectant materials that must be carved or machined into desired shapes. With the material of the present invention, a host of different non-planar shapes can be formed with minimal effort. These types of thin, flexible, formable materials having at least 90% reflectivity should have great value for a host of applications requiring thin diffuse reflective materials, such as projection screens, fluorescent light reflectors, photographic umbrellas, luminaire reflectors, backlighted displays, preferably backlighted displays for lap top computers, etc.

Figure 6:
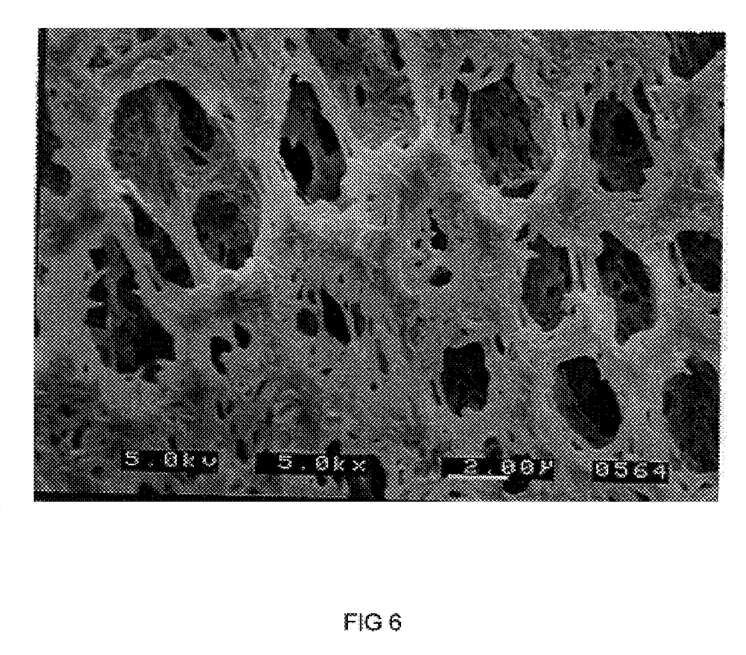
FIG. 6 is an SEM, enlarged 5000 times, showing the surface of another embodiment of a light reflectant material of the present invention.

The preferred material of the present invention has a thickness of 0.02 to 0.25 mm, and especially preferred is a material having a thickness of 0.07 to 0.15 mm. It should be appreciated, however, that thicker materials, such as those having a thickness of 0.25 mm or more, still have a number of improved properties, such as flexibility, low cost, etc., that may make them desirable for use in place of other materials in various diffuse reflective applications.

under the part number Nylaflo 66604. FIG. 6 is a scanning electron micrograph (SEM) of the surface of the porous nylon.

Figure 7:
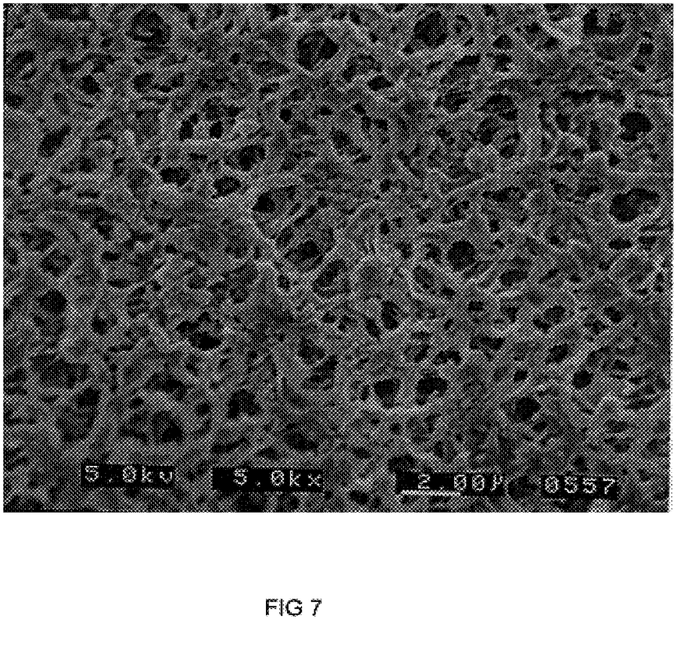
FIG. 7 is an SEM, enlarged 5000 times, showing the surface of another embodiment of a light reflectant material of the present invention.

Sample 3 is a porous polyvinylidene fluoride (PVDF) membrane of 0.22 micron pore size obtained from Millipore in Bedford, Mass., under part number Durapore GVHP 142 50. FIG. 7 is a scanning electron micrograph (SEM) of the surface of the PVDF.

Sample 4 is a non-porous 0.13 mm polyester film obtained from ICI Films in Wilmington, Del., under the trademark MELINEX. FIG. 9 is a scanning electron micrograph (SEM) of the surface of the MELINEX material. It can be seen from the SEMs that inventive samples 1, 2, and 3 are highly porous where comparative sample 4 is essentially non-porous.

The properties of these materials are reported in the following table:

| Sample | Material | Product Name | Pore Size (µm) | Refractive Index | Thickness (in) | Sample Density (g/cc) | Specific Gravity (g/cc) | Sample Porosity (%) |
| --- | --- | --- | --- | --- | --- | --- | --- | --- |
| 1 | Cellulose Acetate | Sartorius | 0.22 | 1.46–1.50 | 0.0045 | 0.43 | 1.30 | 67% |
| 2 | Nylon 66 | NylaFlo | 0.2 | 1.53 | 0.0045 | 0.26 | 1.13 | 77% |
| 3 | PVDF | Durapore GVHP | 0.22 | 1.42 | 0.0045 | 0.64 | 1.76 | 64% |
| 4 | Polyester | Melinex | NA | 1.56–1.64 | 0.0050 | 1.37 | 1.38 | <1% |

Without intending to limit the scope of the present invention, the following examples illustrate how the present invention may be made and used:

EXAMPLE 1

Figure 1:
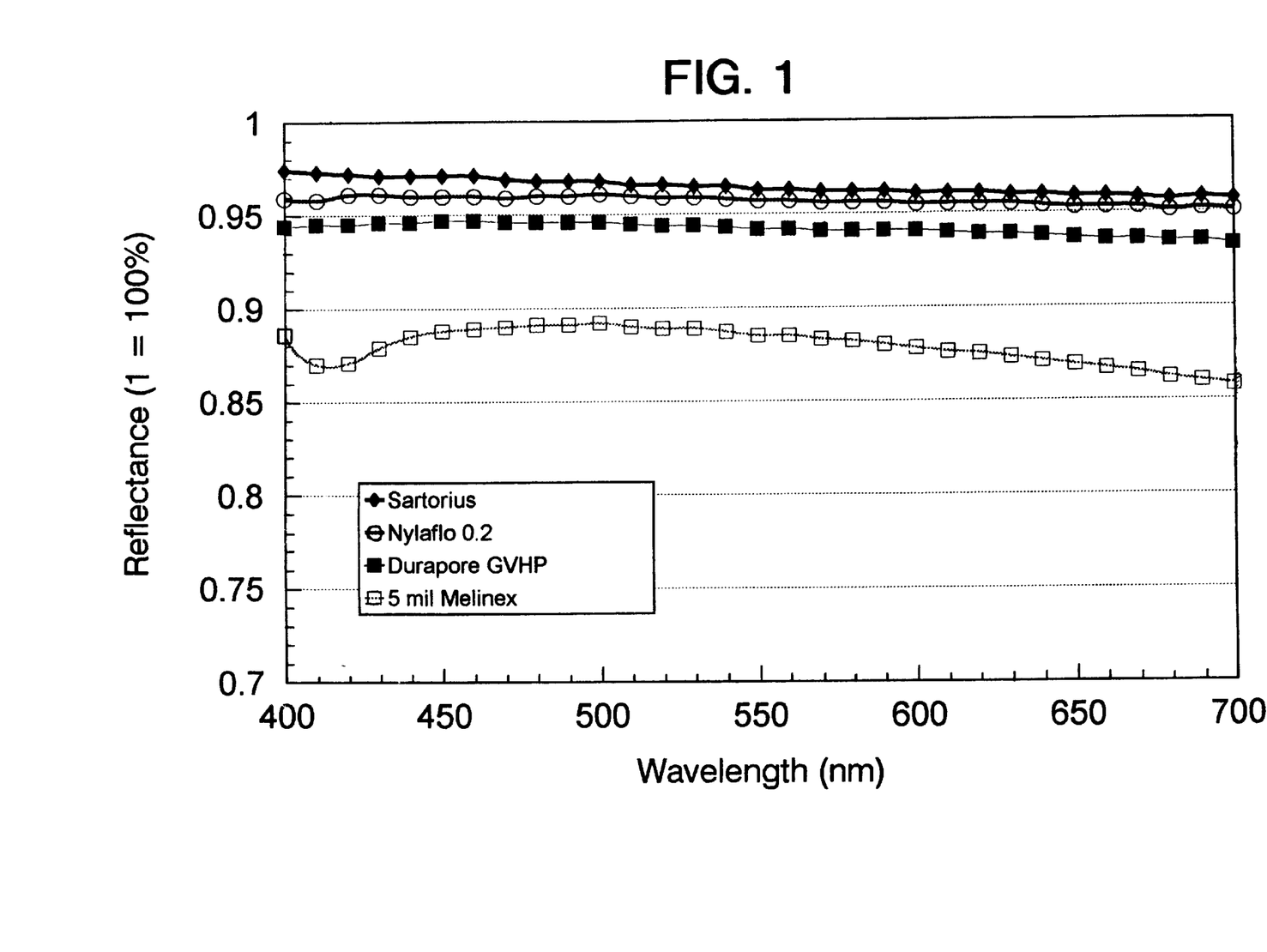
FIG. 1 is a graph plotting the reflectance versus wavelength of various inventive and comparative materials.

The graph of FIG. 1 records the reflectance vs. wavelength of three inventive porous reflective materials along with one comparative material.

Inventive samples 1, 2 and 3 are tested along with comparative sample 4 for total hemispherical reflectance using CARY 5E Spectrophotometer with a Labsphere integrating sphere as described as follows:

A 2 inch by 2 inch swatch from each sample is placed in a CARY 5E Spectrophotometer with a Labsphere integrating sphere. The spectral range measured is 175 nm to 2500 nm. Data below 250 nm is not reported due to the unreliability of the calibrated standard material below this value. All measurements are in the double-beam mode with the same working standard in the sphere's reference reflectance port. The reflectance standard used is a SPECTRALON material, Labsphere Serial Number SRS-99-010-8111-A. Photomultiplier detection is used below 800 nm and lead sulfide detection is used above 800 nm. All measurements are normalized with respect to the baseline of the system. This data is then corrected by multiplying it by the correction factors supplied with the reflectance standard. This data is then averaged and plotted. The entire visible wavelength range of 400 nm to 700 nm is reported.

Figure 5:
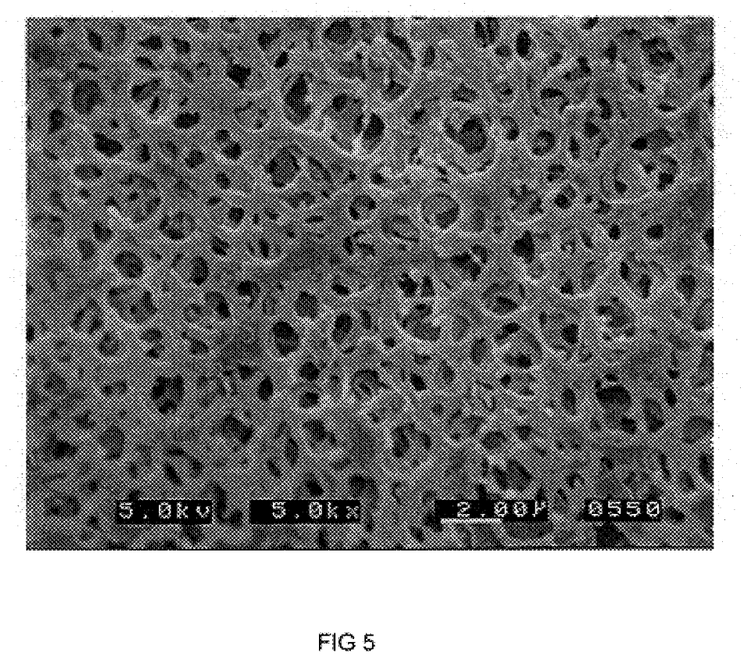
FIG. 5 is a scanning electron micrograph (SEM), enlarged 5000 times, showing the surface of one embodiment of a light reflectant material of the present invention.

The materials tested are as follows:

Sample 1 is a porous cellulose acetate membrane of 0.22 micron pore size for microfiltration obtained from Sartorius Corporation in Edgewood, N.Y., under the part number of 11127.293G. FIG. 5 is a scanning electron micrograph (SEM) of the surface of the cellulose acetate.

Sample 2 is a porous nylon membrane of 0.2 micron pore size obtained from Gelman Sciences in Ann Arbor, Mich., Refractive index and specific gravities are obtained from the *Modern Plastics Encyclopedia,* Volume 63 Number 10A, McGraw Hill (1986). Thickness is measured using 0.0001 to 0.050 inch (0.0025 mm to 1.27 mm) dial thickness gage. Weight is measured using a gram scale with 0.001 gram resolution. Sample density is calculated based on weight per volume. Porosity is calculated using the following formula:

$$\text{Porosity (\%)} = \{1 - (\text{Sample density} \div \text{Specific gravity})\} \times 100$$

The graph of FIG. 1 demonstrates that the porous films with a high refractive index of equal to or greater than 1.42 of samples 1, 2, and 3 exhibit relatively high reflectance of greater than 93% over the entire visible wavelength range. On the other hand, sample 4, a non-porous, high refractive index film has only a maximum reflection of 89.2% over the entire visible wavelength range. Therefore, this demonstrates that a material with the combination of both high index of refraction and significant porosity provides higher reflection than a material with a high index of refraction without significant porosity.

EXAMPLE 2

Inventive samples 1, 2, and 3 are tested along with comparative sample 4 for levels of diffusivity using a model number PG-3 glossmeter available from Hunter Lab in Reson, Va. This data is reported in the following table.

|         | Sample 1 |      |      | Sample 2 |      |      | Sample 3 |     |      | Sample 4 |      |      |
|---------|----------|------|------|----------|------|------|----------|-----|------|----------|------|------|
| Reading | 20°      | 60°  | 85°  | 20°      | 60°  | 85°  | 20°      | 60° | 85°  | 20°      | 60°  | 85°  |
| 1       | 2.2      | 20.4 | 81.0 | 1.7      | 12.0 | 71.7 | 1.5      | 5.2 | 44.2 | 26.4     | 73.7 | 94.5 |
| 2       | 1.9      | 21.0 | 80.5 | 1.7      | 11.0 | 68.5 | 1.5      | 5.3 | 52.1 | 24.5     | 72.1 | 94.6 |
| 3       | 2.3      | 20.7 | 82.3 | 1.7      | 10.8 | 67.3 | 1.5      | 5.6 | 54.3 | 20.1     | 63.4 | 96.7 |
| Average | 2.1      | 20.7 | 81.3 | 1.7      | 11.3 | 69.2 | 1.5      | 5.4 | 50.2 | 23.7     | 69.7 | 95.3 |

The instrument is designed to quantify the relative levels of gloss of material surfaces. Gloss is the measurement of light reflected at the specular angle, the angle equal and opposite to the angle of light hitting the sample. For most gloss measurements, light is directed onto a sample a 60° from the perpendicular. The percent of light that is reflected at the specular angle (−60°) is reported as the gloss. While 60° is the most commonly used gloss angle, 85° is used for low gloss samples and 20° is used for high gloss samples. If the 60° reading is greater than 70, it is suggested by the gloss meter manufacturer to use the 20° angle. If the 60° is less than 10, it is suggested to use the 85° angle.

For measurement of homogeneous surface white reflective materials that are relatively high in total reflectance, it is assumed that low specular reflective measurements indicate a high level of diffusivity. In the above table, the four different materials mentioned above are compared for levels of gloss, or inversely, levels of diffusivity. It can be seen that the MELINEX material has a comparatively high degree of specular reflectance as compared to the three porous materials. The three porous materials, samples 1, 2, and 3, all exhibit relatively low gloss readings, demonstrating that these are relatively diffuse reflective materials.

EXAMPLE 3

Figure 2:
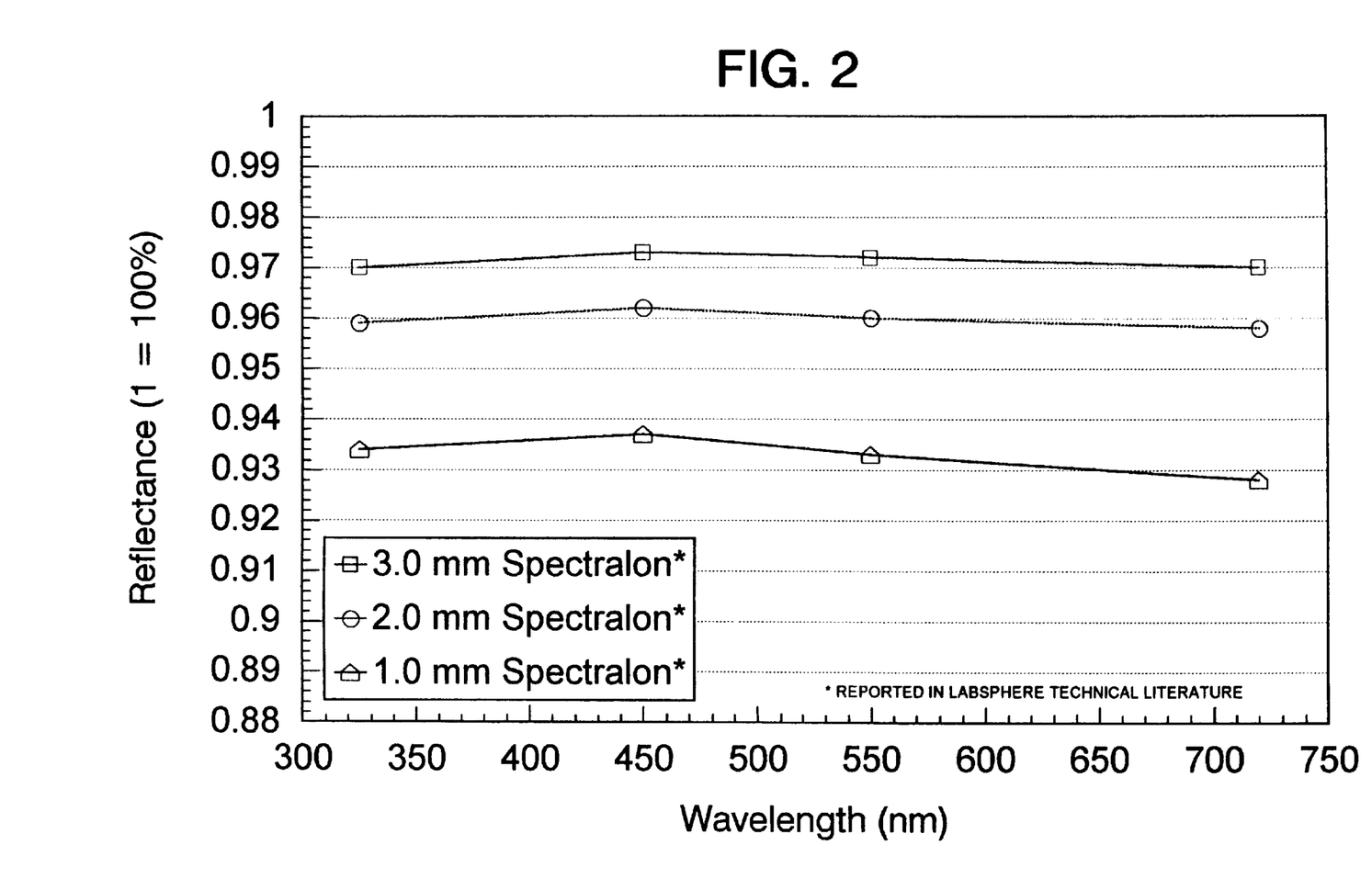
FIG. 2 is a graph plotting the reflectance versus wavelength of three thickness levels of a comparative reflectant material.

The graph of FIG. 2 is a comparative example and records the reflectance verses light wavelength of different thicknesses of SPECTRALON reflective material. The respective lines represent the performance of 1.0 mm, 2.0 mm, and 3.0 mm thick samples of SPECTRALON material according to published data from the technical catalog of Labsphere, Inc. It is important to note that as thickness decreases, the reflectance properties substantially decline. Furthermore, the reflectance properties of the 1 mm thick SPECTRALON material, although eight times thicker than all of the inventive samples from Example 1, demonstrates lower reflectance than said samples.

EXAMPLE 4

Figure 3:
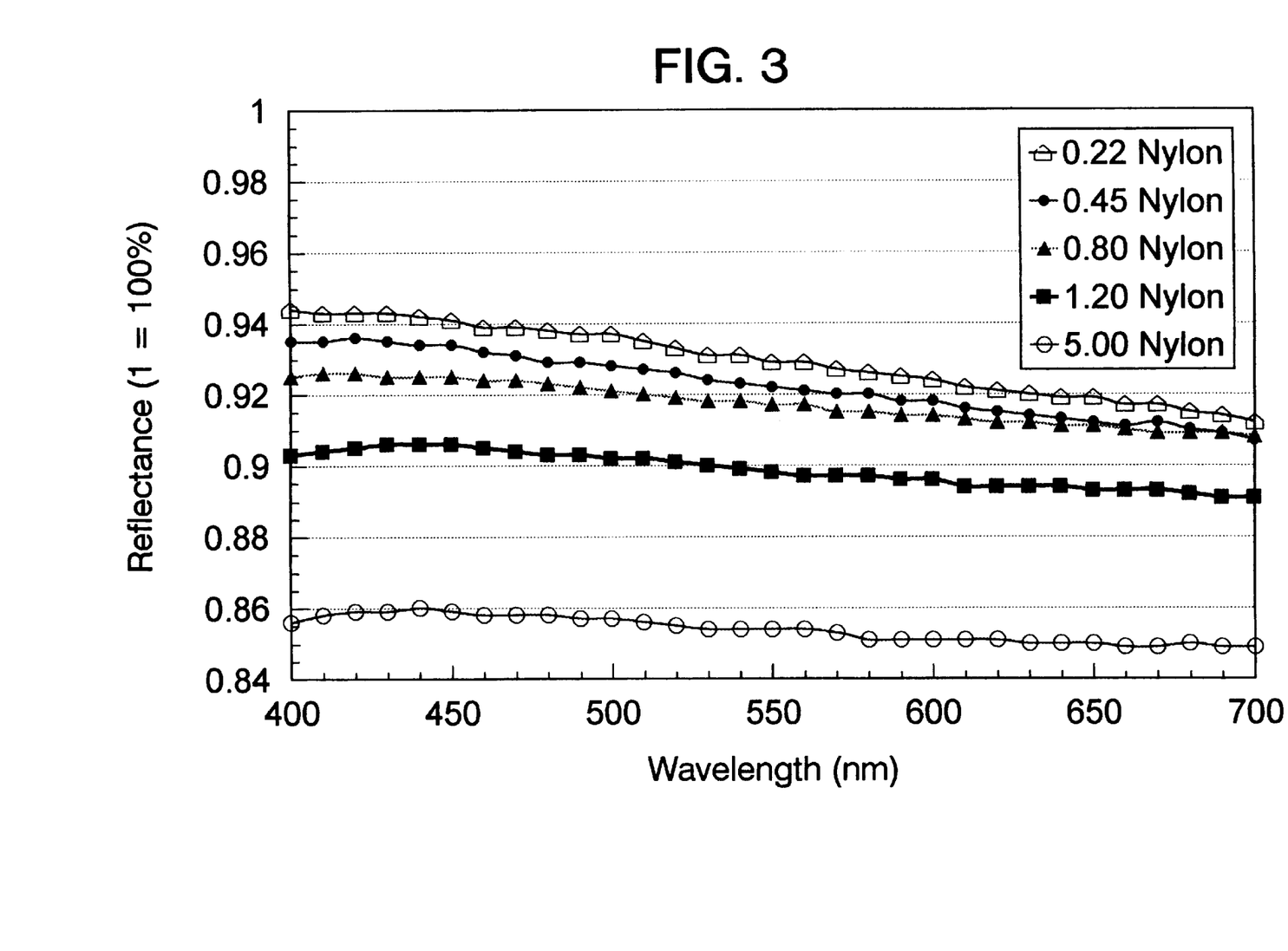
FIG. 3 is a graph plotting the reflectance versus wavelength of five similar materials having different pore sizes.

The graph of FIG. 3 records the reflectance versus wavelength of five samples of inventive porous reflective materials all of the same base material and thickness but differing in pore size.

These inventive samples 5 through 9 are measured for total hemispherical reflectance using CARY 5E Spectrophotometer with a Labsphere integrating sphere as described in Example 1. The entire visible wavelength range of 400 nm to 700 nm is reported.

Samples 5 through 9 are porous nylon 6,6 of different pore sizes but sharing similar thickness and porosity levels obtained from Poretics Corporation in Livermore, Calif.

| Sample | Material | Part number | Pore Size ($\mu$m) | Refractive Index | Thickness (in) | Sample Density (g/cc) | Specific Gravity (g/cc) | Sample Porosity (%) |
|--------|----------|-------------|------|------|--------|------|------|-----|
| 5 | Nylon | 85651 | 0.22 | 1.53 | 0.0042 | 0.51 | 1.13 | 55% |
| 6 | Nylon | 85652 | 0.45 | 1.53 | 0.0036 | 0.51 | 1.13 | 55% |
| 7 | Nylon | 85654 | 0.80 | 1.53 | 0.0040 | 0.46 | 1.13 | 59% |
| 8 | Nylon | 85655 | 1.20 | 1.53 | 0.046  | 0.51 | 1.13 | 55% |
| 9 | Nylon | 85657 | 5.00 | 1.53 | 0.0041 | 0.45 | 1.13 | 60% |

Refractive index and specific gravities are obtained from the *Modern Plastics Encyclopedia*, Volume 63 Number 10A, McGraw Hill (1986). Thickness is measured using 0.0001 to 0.050 inch dial thickness gage. Weight is measured using a gram scale with 0.001 gram resolution. Sample density is calculated based on weight per volume. Porosity is calculated using the following formula:

$$\text{Porosity }(\%) = \{1 - (\text{Sample density} \div \text{Specific gravity})\} \times 100$$

The graph of FIG. 3 demonstrates that the porous films of samples 5 through 9 exhibit varying levels of reflectivity based on pore size. As can be seen by the above table these materials all have similar thickness, density, and porosity levels all with a high refractive index of 1.53. The difference is that as pore size of the sample decreases the level of reflectivity increases. The smaller pore sizes of 0.22, 0.45, and 0.80 micron exhibit relatively high reflectance of greater than 90% over the entire visible wavelength range. It is believed that even smaller pore size materials could further increase the levels of reflectivity.

EXAMPLE 5

Inventive samples 5 through 9 are then tested for levels of diffusivity in the same manner as Example 2 using a model number PG-3 glossmeter available from Hunter Lab in Reson, VA. This data is reported in the following table.

|         | Sample 5 | | | Sample 6 | | | Sample 7 | | | Sample 8 | | | Sample 9 | | |
|---------|---|---|---|---|---|---|---|---|---|---|---|---|---|---|---|
| Reading | 20° | 60° | 85° | 20° | 60° | 85° | 20° | 60° | 85° | 20° | 60° | 85° | 20° | 60° | 85° |
| 1       | 1.4 | 4.8 | 19.6 | 1.4 | 4.7 | 15.8 | 1.4 | 3.8 | 12.0 | 1.3 | 3.1 | 10.6 | 1.3 | 2.7 | 4.0 |
| 2       | 1.4 | 5.2 | 25.5 | 1.4 | 4.3 | 11.8 | 1.4 | 3.7 | 9.9 | 1.3 | 3.1 | 8.2 | 1.3 | 2.9 | 5.5 |
| 3       | 1.4 | 4.9 | 19.5 | 1.4 | 4.4 | 13.1 | 1.4 | 3.7 | 8.1 | 1.3 | 3.1 | 8.0 | 1.3 | 3.0 | 5.3 |
| Average | 1.4 | 5.0 | 21.5 | 1.4 | 4.5 | 13.6 | 1.4 | 3.7 | 10.0 | 1.3 | 3.1 | 8.9 | 1.3 | 2.9 | 4.9 |

All five materials exhibit very low gloss readings, thus demonstrating that all of these materials are highly diffuse reflective.

The above Examples demonstrate that thin diffuse reflectant materials selected in accordance with the present invention perform significantly better than conventional thin diffuse reflective materials.

Due to the diffuse reflectant and structural properties of the present invention, it can be used in numerous possible applications. As a general reflectant material, the present invention can be employed to form reflectant screens (e.g., projection TV or movie screens), reflectors for lap top computer back lit displays, luminaries, highway information placards, etc. Furthermore, specialized reflectors for fluorescent or incandescent lighting can be designed for hospital or clean room environments where soft diffuse lighting is desired yet cleanliness and contamination must be minimized.

The high flexibility of the present invention particularly lends itself to such applications since it can be easily formed into different shapes, and particularly non-planar shapes. The present invention's ability to provide effective reflectance at very thin dimensions also lends itself to use in this regard, particularly by allowing greater design flexibility and by decreasing the cost and weight of the material.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A method of improving light reflectivity in a device requiring diffuse reflectivity of light comprising providing a microporous polymer comprising a reflectant material with an index of refraction greater than or equal to 1.42, and selected from the group consisting of nylon, polyvinylidene (PVDF), and cellulose acetate, a porosity of greater than 10%, and less than about 0.25 mm in thickness; and mounting the reflectant material within the device to cause light energy to reflect off it;

whereby the reflectant material provides diffuse reflectivity with greater than 90% of the light striking the reflectant material reflecting from the material.

2. The method of claim 1 that further comprises providing as the reflectant material a flexible sheet of nylon, allowing the reflectant material to be readily formed into different shapes; and forming the reflective material to provide a non-planar reflective surface.

3. The method of claim 1 that further comprises thickness of less than about 0.15 mm.

4. The method of claim 1 that further comprise providing a reflectant material with a porosity of about 25% to 85%.

5. The method of claim 4 that further comprises providing as the reflectant material a material with a thickness of less than about 0.15 mm.

6. The method of claim 1 that further comprise providing a reflectant material with a porosity of about 40% to 80%.

7. The method of claim 1 that further comprises employing the reflectant material as a light reflectant panel.

8. The method of claim 1 that further comprises employing the reflectant material as a light reflective surface within a luminaire.

9. The method of claim 1 that further comprises choosing the light reflectant material from the group consisting of nylon, polyvinylidene (PVDF), and cellulose acetate.

10. A method of providing improved diffuse reflectivity of light in a device comprising providing a reflectant material comprising a polyamide polymer having an index of refraction of greater than or equal to 1.42, a porosity of greater than 10%, less than about 0.25 mm in thickness, the reflectant material being flexible so as to allow the material to be readily formed into various shapes; and mounting the reflectant material within the device to cause light energy to reflect off it;

whereby the reflectant material provides diffuse reflectivity with greater than 90% of the light striking the reflectant material reflecting from material.

11. The method of claim 10 that further comprises forming the flexible reflectant material to provide a non-planar reflective surface.

12. The method of claim 10 that further comprises providing as the reflectant material a reflectant material with a thickness of less than about 0.15 mm.

13. The method of claim 10 that further comprises employing the reflectant material as a light reflectant panel.

14. The method of claim 10 that further comprises employing the reflectant material as a light reflective surface within a luminaire.

* * * * *